Dec. 22, 1959 M. W. BULLOCK ET AL 2,918,631
MODULATOR-REGULATOR CIRCUIT
Filed Oct. 3, 1957
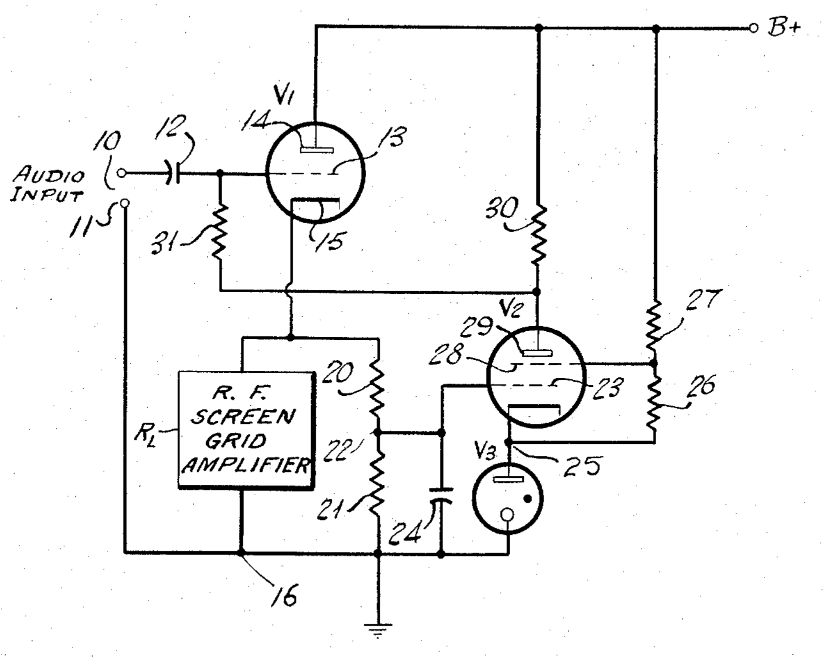
INVENTORS
MARK W. BULLOCK
JOSEPH B. SAINTON
BY
Moses, Nolte, & Nolte
ATTORNEYS United States Patent Office 2,918,631

Patented Dec. 22, 1959

2,918,631

MODULATOR-REGULATOR CIRCUIT

Mark W. Bullock and Joseph B. Sainton, Dallas, Tex., assignors to Continental Electronics Manufacturing Company, Dallas, Tex., a corporation of Texas Application October 3, 1957, Serial No. 687,955

4 Claims. (Cl. 332—64)

The present invention relates to a modulator and particularly to a screen grid modulator for radio frequency carrier waves.

The invention provides a screen grid modulator for a radio frequency amplifying stage, which maintains a constant D.C. screen potential in spite of widely varying screen grid current, and at the same time, modulates the screen grid, by superimposing on the D.C. potential, an audio frequency or other signal voltage which varies from approximately zero to double the D.C. potential. The constant D.C. potential on the screen grid of the modulated tube, prevents shifting of the carrier level of the modulated R.F. output.

An object of the present invention is to provide a radio frequency screen grid modulator which has a high efficiency.

Another object of the invention is to provide a modulator of the type described above having very low distortion, by virtue of the fact that the bias voltage of the modulating tube is adjusted in proportion to the input signal, and overloading is thus avoided.

A general object of the invention is to provide a modulator which maintains a constant D.C. output voltage on which is superimposed a signal voltage having low distortion, despite a widely varying load impedance; the circuit being free of any iron core component, so that the audio frequency response of the modulator is extremely good.

The invention will be fully understood, and the above and other objects and advantages thereof will become apparent from the following description and the drawings in which the figure shows a circuit diagram of one embodiment of the invention.

Referring to the drawings, the audio signal input is applied between terminals 10 and 11 and fed through capacitor 12 to the control grid 13 of tube V1. The tube is connected as a cathode follower, the anode 14 being connected directly to a source of B+ voltage. Cathode 15 is connected to the screen grid of an electron tube amplifier which modulates the amplitude of a radio frequency carrier wave in accordance with the audio signal applied to tube V1. The screen grid circuit of the modulated amplifier stage produces a varying load impedance RL between cathode 15 and ground 16. The screen grid current of the modulated radio frequency stage will vary widely with variations of the audio signal, and will thereby cause wide variation in the load RL and tend to cause variations in the D.C. voltage of cathode 15. It is necessary to prevent such variations and maintain a constant D.C. potential at the screen grid of the radio frequency stage in order to avoid carrier amplitude shift of the modulated radio frequency output.

The circuit for maintaining the D.C. potential of the screen grid substantially constant comprises resistors 20 and 21 connected in series across load RL. An intermediate point 22 of said resistors is connected to control grid 23 of electron tube V2. Resistor 21 is by-passed by capacitor 24 to eliminate the audio frequency component of the voltage across the load and permit only a portion of the D.C. component to be impressed on control grid 23. Cathode 25 of tube V2 is connected to ground through voltage regulator tube V3. Cathode 25 is also connected to B+ through resistors 26, 27, so that the cathode is maintained at a substantially constant D.C. reference output voltage determined by the voltage rating of tube V3. Resistors 26, 27 also supply a D.C. potential to screen grid 28. The anode 29 is connected through load resistor 30 to B+, and through a resistor 31 to control grid 13. Thus a portion of the D.C. potential of cathode 15 is impressed on control grid 23 and amplified by the D.C. amplifier comprising tube V2. The amplified D.C. potential is supplied through resistor 31 to control grid 13 in such a manner that when the D.C. potential of cathode 15 decreases, the potential of grid 13 is increased, and vice versa. The grid potential changes will produce like changes of the cathode D.C. potential and compensate departures from a constant value thereof.

The modulating tube V1 operates with low-plate current when there is no input signal, and with high-plate current at full input signal, which is comparable to class AB1 operation, except that the change in the operating point is brought about by an external D.C. amplifier V2. The efficiency of the modulator is high, since its D.C. current is low when the signal is low. The distortion of the modulating circuit is very low, because the operating bias is adjusted in proportion to the input signal and overloading is thus avoided. The circuit of tube V1 permits no grid current to flow. The change in average plate current of tube V1 is always very nearly equal to the change in average screen grid current of the modulated tube, and this results in a very nearly constant screen grid potential.

For the sake of clarity, we have shown and described a simple circuit embodiment of our invention, omitting what is unnecessary to an understanding thereof. It will be understood, however, that many variations and additions to the embodiments herein disclosed will be apparent to those familiar with this art, and, therefore, the invention is not to be considered as being limited except as defined in the following claims.

What is claimed is:

1. Modulating apparatus comprising a first electron tube, a signal input circuit connected to the control grid of said tube, a screen grid electron tube carrier wave amplifier stage, the cathode of said tube being connected to the screen grid of the carrier wave stage, whereby the screen grid circuit of said stage produces a variable load between said cathode and ground; and voltage regulating means for maintaining the average direct current potential of said cathode substantially constant, said voltage regulating means comprising a second electron tube, means for applying a portion of said direct current potential between the control grid and cathode of the second electron tube, a load resistor connected to the anode of the second tube, and a direct current connection means between the anode of the second tube and the control grid of the first tube for causing the direct current potential of the control grid of the first tube to vary oppositely to the direct current potential of the cathode of the first tube.

2. Modulating apparatus according to claim 1, wherein the first electron tube is connected as a cathode follower circuit.

3. Modulating apparatus according to claim 2, wherein the means for applying a portion of the direct current potential between the control grid and the cathode of the second electron tube comprises a plurality of resistors connected in series between the cathode of the first tube and ground, a direct current connection from the control grid of the second electron tube to an intermediate point of said plurality of resistors, and a by-pass condenser for signal frequencies connected between said intermediate point and ground.

4. Modulating apparatus comprising a cathode follower modulating circuit including a first electron tube, an audio frequency signal input circuit connected to the control grid of said tube, a screen grid electron tube radio frequency carrier wave stage, the cathode of said first tube being connected to the screen grid of the carrier wave electron tube stage, whereby the screen grid circuit of said carrier wave stage provides a variable load between said cathode and ground; and voltage regulating means for maintaining the direct current potential of said cathode substantially constant, said voltage regulating means comprising a direct current amplifier having its input connected to said cathode and its output connected to said control grid so as to vary the control grid potential oppositely to the potential of said cathode.

References Cited in the file of this patent

UNITED STATES PATENTS

| | | |
|---|---|---|
| 2,120,884 | Brown | June 14, 1938 |
| 2,304,552 | Deerhake | Dec. 8, 1942 |
| 2,711,513 | Baer | June 21, 1955 |
| 2,806,136 | Harris et al. | Sept. 10, 1957 |